United States Patent [19]
Wolf et al.

[11] Patent Number: 5,193,406
[45] Date of Patent: Mar. 16, 1993

[54] ON-STREAM METHOD FOR DETECTING EROSION OR PLUGGING FOR MANIFOLDED FEED NOZZLE SYSTEMS

[75] Inventors: Henry A. Wolf, Franklin Lakes; Richard J. Bellows, Hampton; George D. Cody, Princeton, all of N.J.

[73] Assignee: Exxon Research and Engineering Company, Florham Park, N.J.

[21] Appl. No.: 718,047

[22] Filed: Jun. 20, 1991

[51] Int. Cl.⁵ .......................................... G01N 19/000
[52] U.S. Cl. ................................................ 73/865.9
[58] Field of Search ................ 73/3, 1 R, 861, 865.9, 73/61 R, 19.01, 19.04; 239/71, 74

[56] References Cited

U.S. PATENT DOCUMENTS

| | | | |
|---|---|---|---|
| 4,357,670 | 11/1982 | McFarlane | 73/861 |
| 4,824,016 | 4/1989 | Cody et al. | 73/861.18 |
| 4,917,296 | 4/1990 | Konieczynski | 239/71 |
| 4,932,232 | 6/1990 | Ballyns et al. | 239/74 |
| 5,004,152 | 4/1991 | Baker et al. | 239/71 |

Primary Examiner—Hezron E. Williams
Assistant Examiner—Nashmiya Ashraf
Attorney, Agent, or Firm—Ronald D. Hantman

[57] ABSTRACT

A on-line method for detecting erosion or plugging for manifolded feed nozzle systems which carry two-phase liquid/gas flow by determining a liquid flow parameter related to liquid flow. The method can determine whether the erosion is at the liquid nozzle or the gas restriction orifice. The amount of erosion or plugging can be quantified.

18 Claims, 7 Drawing Sheets

ON-STREAM METHOD FOR DETECTING EROSION OR PLUGGING FOR MANIFOLDED FEED NOZZLE SYSTEMS

BACKGROUND OF THE INVENTION

The present invention describes an on-stream method for detecting erosion or partial plugging of manifolded nozzles or restriction orifices (RO) in a two phase (gas/liquid) feed system. The method does not require direct mechanical contact between the sensor and liquid material.

Two phase nozzles are important for a variety of applications particularly for the injection of atomized feed in chemical or petroleum processing operations. In many such processes, operability or selectivity improvements result when an atomized hydrocarbon liquid is sprayed in a controlled and measured manner into the reaction zone, particularly when a process catalyst is involved. One example is the process of fluidized catalytic cracking (FCC) of higher boiling petroleum fractions. Typically, a high degree of atomization is achieved by mixing the liquid feed with a gas and injecting the mixture into the process from a feed nozzle designed to produce finely dispersed drops. In catalytic cracking, steam is typically used as the atomizing gas, but any process compatible gas may be used.

The need to control and measure the distribution of the atomized liquid sprayed into a process vessel is normally satisfied by using multiple services or nozzles. Maintaining the proper mixture of liquid to steam for atomization, and ensuring that each nozzle carries a specified liquid or mass flow, enables potential unit operating advantages. One common operating mode is to maintain equal liquid flow in each nozzle. Appropriate atomization is maintained by ensuring proper flow rates to nozzles with carefully designed geometries that are assumed invariant with operations. Most installations which have multiple feed nozzles usually include block valve or restriction orifices on the liquid and gas lines to an individual nozzle; but these controls do not uniquely determine the liquid flow. When nozzles are fed from a common manifold, there is no assurance that the liquid flow through each nozzle is optimized since only the net liquid flow to the total manifold can be readily measured. In contrast, the gas flow to a nozzle is usually determined by a restriction orifice on the gas line which ensures relatively definitive gas distribution to the individual nozzles.

Measuring mass flow of a liquid is not new. There are a variety of flow meters that have been used to measure mass flow. Some of them are mechanical in nature utilizing the force of a moving liquid to turn a wheel or deflect a needle. Such flow meters can only measure mass flow in single phase conditions and are usually restricted to non-fouling liquids. Those flow meters available for the single phase flow common to the petroleum and petrochemical industry tend to be quite costly. The very high temperatures that are maintained to reduce flow viscosity impose yet other complications. Furthermore, the service liquids readily foul and clog the mechanical components of such flow meters.

There are a variety of flow meters known as "vortex flow meters" that utilize vortex wakes proceedings from obstacles placed in the flow to measure the velocity of the flow from the frequency of vortex shedding. Such flow meters are again limited to single phase flow. Again, they require placement of an obstacle in the flow, and hence are again prone to fouling. The temperature range of most systems is narrow due to fundamental restrictions on the sonic transducers required to pick up the sound generated by the obstacle.

There are a variety of acoustic flow meters that utilize ultrasonics to measure flow. A class of such flow meters utilizes an ultrasonic transducer/receiver attached to the pipe containing the moving fluid, and an ultrasonic receiver/transducer attached to the same pipe upstream and/or downstream of each other. The high operating temperature of many petroleum and petrochemical processes, as well as geometrical constraints on the attachment of the acoustic device, make these flow meters expensive and difficult to apply in many petroleum and petrochemical applications. The temperatures often exceed the operating limits of many single phase flow meters.

Measurement of the liquid fraction of a gas/liquid mixture flowing through two phase nozzles is difficult. Usual devices for flow measurement are sensitive only to the velocity of the flow or its pressure and not to mass flow. Hence, such devices are incapable of measuring liquid flow without separate and equally complex measurements of the density of the mixture. Devices that are capable of measuring single phase liquid flow are expensive and are often intrusive since they require the insertion of an orifice or barrier in the flow which can be easily fouled by the liquid portion of the mixture. Since in most petroleum and petrochemical applications, the two phase mixture is maintained at an elevated temperature to achieve a sufficiently low viscosity for flow, there is a temperature limitation on flow measurement devices as well.

Thus most petroleum and petrochemical installations do not meter flows to each feed nozzle because suitable flow meters and control valves are expensive due to the severity of process conditions and pipe geometry limitations. The development of specialized flow meters to meet such stringent conditions would require significant expense and undesired complexity. Moreover, existing techniques do not permit on-line identification of partial plugging or erosion at individual feed nozzles. Current practices do utilize pressure sensors at nozzles to identify conditions that can be attributed to significant plugging.

Although petroleum and petrochemical processing units may demonstrate improved operation with specified liquid distribution and feed atomization from manifolded feed nozzles, only the net liquid flow to the manifold is usually measured or controlled. However, the probability of flow imbalance, erosion, or plugging among feed nozzles is large due to the complex nature of two phase fluid exiting the nozzle. Uncertainties in liquid distribution are compounded by the possibility that the liquid portion of the fluid could be vaporized. The existence of such flow imbalance is usually inferred only by anomalous process conditions or changes in process output yields over an extended period of time. Furthermore, the feed nozzle throat can partially plug or erode leading to significant flow maldistributions and/or poor feed atomization which can remain undetermined until the unit is shut down for maintenance. Similar plugging or eroding can also occur at the steam restriction orifice. There is thus a need for a technique that can measure and monitor erosion or partial plugging at an individual nozzle. Early identification of nozzle throat erosion or plugging enables operational changes to the process. Such changes include mechanical repairs (where possible) and flow redistribution via adjustments in the oil block valve.

SUMMARY OF THE INVENTION

The present invention describes a method for identifying and quantifying erosion or partial plugging to individual nozzles or ROs in two phase (gas/liquid) feed services. In this invention, nozzle throat erosion or plugging includes any physical change in dimensions which affects nozzle pressure drop. Such changes include, but are not limited to, erosion or deposits at constrictions or mixing vanes. With the use of this invention, geometric changes to the nozzle throat can be distinguished from the changes at the gas RO. The invention requires that an absolute calibration technique be available for relating the per nozzle liquid flow rates to specified parameters that correspond approximately linearly to liquid flow rate (the liquid flow parameter, $P_{ij}$, for the ith nozzle and the jth manifold condition). Examples of suitable liquid flow parameters are: pressure (static or dynamic); the liquid flow peak in a frequency spectrum; and the gas peak in a frequency spectrum. The liquid flow peak and gas peak can be readily measured with an accelerometer vibration sensor. The present invention shows how liquid flow parameters can be easily measured using simple to maintain transducers that are in common use, some of which do not require mechanical contact with the liquid. Moreover, the technique can be applied in an on-line electronic mode or manually. Any transducer can be used that provides an approximately linear indication with respect to flow, including:

(1) a pressure transducer (static or dynamic) in contact with the gas downstream of the restriction orifice (RO) controlling the gas contribution to the two phase (gas/liquid) flow;

(2) an accelerometer or other vibrational sensor in contact with the solid borne sound generated by the restriction orifice (RO) controlling the gas or in contact with the liquid flow turbulence within the nozzle;

(3) other transducers with functionally consistent indications of the mass of liquid flow.

The liquid flow parameter measured by a dynamic pressure transducer or accelerometer is defined for a signal integrated over a specific frequency band. Typically, the actual integration computes the band-limited root-mean-square (rms) acceleration by first squaring the data, integrating, and then calculating the square root of the result. That frequency band of interest is determined experimentally such that the integrated response is monotonically related to liquid flow rate. The experimental determination is accomplished by incrementing the liquid flow rate in discrete steps while measuring the liquid flow parameter. Frequency bands for the liquid flow parameters in petroleum and petrochemical applications have been observed as: 0–6400 Hz (acceleration liquid flow peak); 4000–12,000 Hz (acceleration gas peak); 0–1000 Hz (dynamic pressure). The liquid flow peak and dynamic pressure are monotically increasing for increasing liquid flow; the gas peak is monotonically decreasing for increasing liquid flow. For these particular examples, the monotonic relationship is approximately linear for FCC manifolds. The liquid flow peaks are generated by the flowing and mixing liquid. The gas peaks are generated by the gas flow and pressure drop across the RO.

This invention identifies plugging or erosion by comparing changes in the nozzle flow characteristics as measured by the above transducers. More specifically, their flow characteristics are specified by the calibration coefficients relating the liquid flow parameter, $P_{ij}$, to the liquid flow rate. Comparisons may be made to historically archived data or to calibration curves with other identical nozzles on the same manifold.

From the method taught in this invention, changes in nozzle throat orifice geometry can be distinguished from changes at the RO in real time for a wide degree of liquid/gas atomization conditions in individual feed services or nozzles. Since the method depends on quantities related to the mass of the flowing fluid, it is a widely applicable technique for many categories of two-phase fluid sprayers. Since the output of the method taught is electronic in nature, it is easily transmitted to a control system and can be used to automatically control the feed flow through individual nozzles fed off a common manifold.

BRIEF DESCRIPTION OF THE DRAWINGS

a) Effect of nozzle geometry change on RO acceleration gas peak b) Effect of nozzle geometry change on static pressure downstream of RO c) Effect of RO geometry change on RO acceleration gas peak d) Effect of RO geometry change on static pressure downstream of RO

DESCRIPTION OF THE PREFERRED EMBODIMENT

The present invention describes an on-stream method for identifying and quantifying erosion or partial plugging to manifolded nozzles or ROs in a two phase (gas/liquid) feed system. Geometric changes to the nozzle can be distinguished from the changes at the gas RO. The method requires measuring a quantity that responds approximately linearly (the liquid flow parameter, $P_{ij}$) with respect to the mass or volume of liquid flow. These liquid flow parameters are functionally related to the liquid flow rate by the measurement of calibration coefficients. Changes in the curve (calibration coefficients) relating the liquid flow parameter to the liquid flow rate can be correlated to the geometry changes in the RO or nozzle throat orifice. For linear relationships, these changes are manifested by modified calibration coefficients consisting of slopes and axes intercepts. Examples capable of generating the liquid flow parameter include: static pressure; dynamic pressure; the liquid flow peak; the gas peak. Certain advantages have been identified using the gas peak as measured by an accelerometer.

The required transducers are in common use, some of which do not make mechanical contact with the liquid. The invention technique does not require that a mechanical element be in contact with the liquid flow. Moreover, the technique can be applied in an on-line electronic mode, or manually. If the location of change is known (e.g., either nozzle or RO), any transducer can be used that provides an approximately linear indication with respect to flow. However, if the erosion location (nozzle or RO) must be determined, then a sensor sensitive to acoustic or vibratory energy must be used. Typically, an accelerometer is preferable for measuring acoustic or vibratory energy since it has substantial immunity to interference from air borne sound transmission generated by unrelated process noise.

From the method taught in this invention, it is also possible to distinguish changes in nozzle throat geometry from changes at the RO in real time for a wide degree of liquid/gas atomization conditions in individual feed services or nozzles. Since the invention method depends on quantities related to the liquid mass (or volume) of the flowing fluid, it is a widely applicable technique for many categories of two-phase fluid sprayers. Since the output of the method taught is electronic in nature, it is easily transmitted to a control system and can be used to automatically monitor erosion of individual nozzles fed off a common manifold.

Figure 1A:
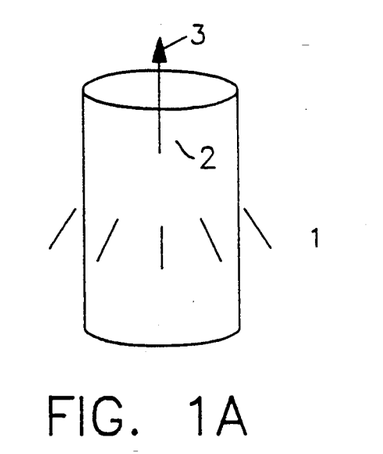
FIG. 1a shows a schematic of the feed injection zone on a fluidized catalytic cracking unit indicating the placement of the feed nozzles.
Figure 1B:
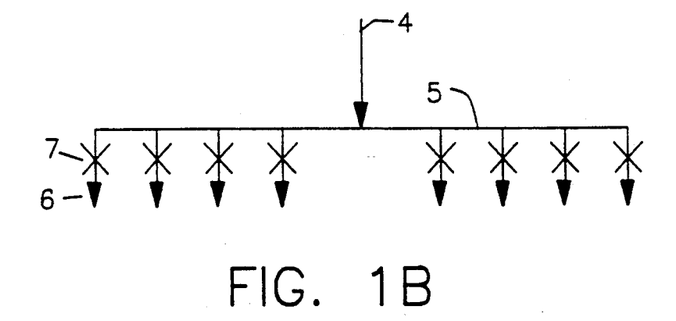
FIG. 1b shows the oil header supplying oil to the manifold and to individual feed nozzles with oil block valves indicated.
Figure 1C:
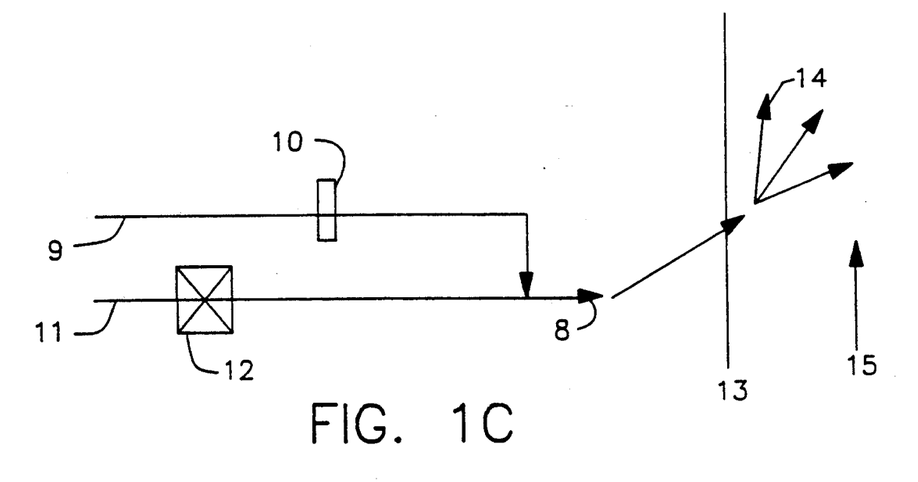
FIG. 1c shows the flow connections to an individual feed nozzle where the steam flow is determined through a restriction orifice (RO) and where the oil flow can be controlled by a block valve.

FIG. 1a is a schematic of the injection region of a typical fluidized catalytic cracking unit showing the location of eight (for this example) feed nozzles (1) injecting into feed riser (2) with catalyst flow (3) indicated. Oil to the feed nozzles is distributed from header (4) to a common manifold (5) as shown in FIG. 1b. As indicated in the figure, individual block valves (7) in each line control the oil flow to the nozzle (6). As shown in FIG. 1c, steam (9) and oil (11) are fed to an individual nozzle; where the steam serves the dual purpose of atomizing the oil and keeping the nozzle unplugged when the oil is off. Oil flow is controlled by the block valves (12) as indicated in FIG. 1c; steam flow is controlled by having the high pressure steam flow through a restriction orifice (RO) (10) which typically under conditions of "choke flow" maintains a constant mass flow of steam independent of the downstream pressure. The pressure upstream of the RO typically remains constant. The nozzle protrudes into feed riser wall (13) to disperse atomized oil (14), onto catalyst flow (15).

Figure 1D:
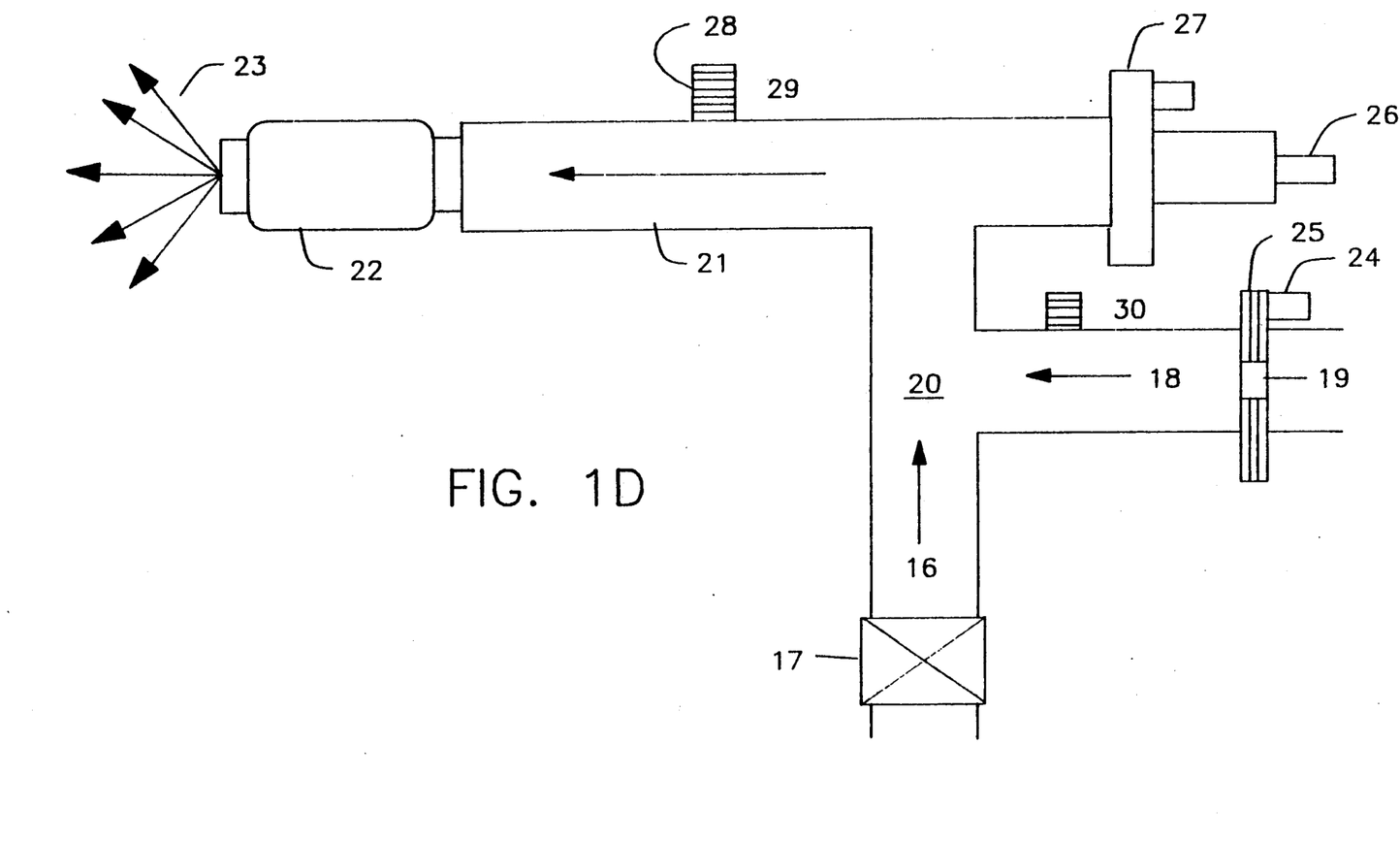
FIG. 1d shows suitable locations for the dynamic pressure transducer which should be in acoustic contact with the gas/liquid downstream of the gas/liquid mixing point; the static pressure transducers should be in contact with the gas; and the accelerometer which should be mounted such that it is sensitive to either: the solid borne sound emitted by the flow through the RO (the gas peak); or the liquid mixing noise generated by the nozzle (the liquid flow peak). The accelerometer may be located on the face or edge of the flange in which the RO is held, or in any convenient point on the feed nozzle such as the rodding plug or nozzle flange. Alternatively, the accelerometer can be mounted so that it is sensitive to the liquid flow noise (such as on the rodding plug).

FIG. 1d shows an individual feed nozzle plumbing in more detail. Oil (16) flowing through block valve (17) mixes with steam (18) controlled by RO (19). The oil/steam mix point (20) is located downstream of both the oil valve and RO. The mixture is pushed through nozzle barrel (21) to nozzle tip (22) and exits as a spray (23) from the nozzle tip.

In one embodiment of the invention, a vibrational sensor (24) is placed on or adjacent to the flange (25) supporting RO (19) or in any location in direct contact with the RO-generated sound and vibration (e.g., the gas peak); or positioned to be responsive to liquid flow-generated sound and vibration such as on the rodding plug (26) or rodding plug flange (27) (e.g., the liquid flow peak). Any location where the accelerometer is sensitive to the changes in the flow noise generated by the RO or liquid/gas mixing is acceptable. In another embodiment of the invention, a static or dynamic pressure transducer (28) is located to be in contact with the flow downstream of the RO or the oil/steam mix point. Any location where the transducer is sensitive to changes in the flow rate is acceptable. Workable examples include location (29) for the dynamic pressure gauge or location (30) for the static pressure gauge.

As noted, this invention teaches a method for identifying erosion or plugging to individual nozzles or ROs in two phase (gas/liquid) feed services. The nozzles used for injecting oil into fluidized catalytic cracking units are of particular importance and will be used for examples in this invention. For these nozzles, the gas is steam and the liquid is oil.

Figure 2A:
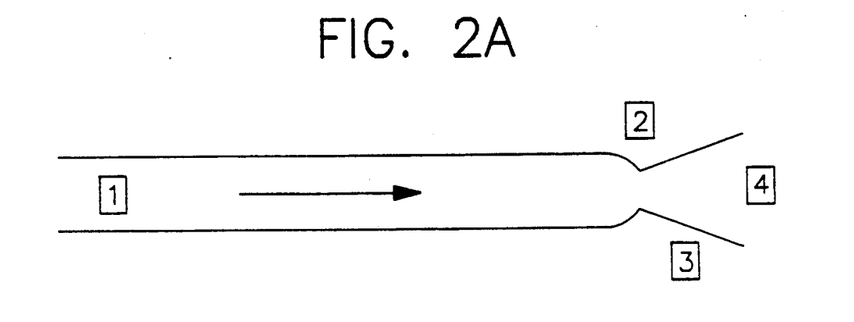
FIG. 2a shows a schematic drawing of a FCCU restriction nozzle.
Figure 2B:
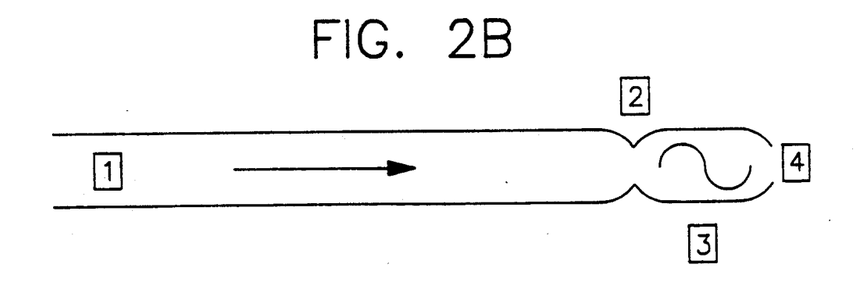
FIG. 2b shows a schematic drawing of a FCCU nozzle with mixing vanes.

FIGS. 2a and 2b show details of two typical nozzle throat geometries used in manifolded FCC feed systems. In those figures, the steam/oil flow mixture (1) enter the nozzle throat (2), to the nozzle mixing chamber (3). Finally, the mixture exits at the nozzle tip (4). The throat area indicated for the restriction type nozzle in FIG. 2a is potentially subject to erosion. In FIG. 2b, the mixing vanes in the nozzle mixing chamber (3) and/or the throat area can become eroded with use. For both of these cases, erosion is believed to be caused by either 1) catalyst particles being pulled into the nozzle; or 2) cavitation of the two phase mixture within the nozzle. Partial nozzle plugging can occur during periods of improper steam to oil ratio, from either deposition of catalyst particles and/or coking of the flow oil.

RO erosion occurs where steam purity and moisture content have not been sufficiently controlled. Plugging has been known to occur from a variety of reasons: catalyst flow reversal (during periods of unexpected shutdown); line debris from rust or improper construction practices. For the purposes of this invention, the mechanism of nozzle/RO erosion or plugging is not important.

To formulate the necessary calibration equations, it is necessary to conduct measurements on the liquid feed system in a multitude of distinct operating conditions, each denoted by the second subscript (j) in the following description.

The generalized functional relationship between the liquid flow parameter and the per nozzle liquid flow rate may be expressed as follows:

$$F_{ij} = f_i(P_{ij}) \quad (1)$$

where:
$F_{ij}$=liquid flow rate for nozzle i under manifold condition j.
$f_i(P_{ij})$=liquid flow rate for nozzle i expressed as a function, $f_i$, of the liquid flow parameter, $P_{ij}$, under manifold condition j. The functional relationship, $f_i$, is assumed invariant to manifold conditions.

Note: all of the double subscript notation follows the convention that the first subscript denotes a specific nozzle, and the second subscript identifies a specific manifold condition.

It has been discovered that $f_i$ may often reduce to a low order polynomial:

$$F_{ij} = A_i + B_i P_{ij} + C_i P_{ij}^2 + \ldots + \quad (2)$$

where:
$A_i$, $B_i$, $C_i$, . . . are the calibration coefficients that define the polynomial relationship correlating flow parameter $P_{ij}$ with liquid flow rate from nozzle i under manifold condition j. The calibration coefficients are assumed invariant to manifold conditions j for fixed manifold geometry.

The examples used for illustration are selected with liquid flow parameters that are linearly related to liquid flow rate. For the important case of manifolded FCC feed nozzles, approximately linear parameters are readily available. For the linear case, Equation 2 reduces to N slopes and N intercepts and can be considered as 2N unknowns. As described subsequently in more detail, N is the number of liquid commissioned nozzles. Equation 3 shows the linearized relationship between the liquid flow parameter and the nozzle liquid flow rate. To determine these slopes and intercepts, it is necessary to conduct measurements on the liquid feed system in a multitude of operating states (denoted on variables by the second subscript). The current invention shows how these slopes and intercepts can be used to detect and monitor geometric changes at the RO and nozzle throat. Changes in the slopes and intercepts can be archived and compared over time. Alternatively, the calibration coefficients of individual nozzles (identical in geometric design) may be directly compared to identify shifts from typical or average behavior.

$$F_{ij} = B_i P_{ij} + A_i \quad \text{Eq (3)}$$

where:

$F_{ij}$=liquid flow rate to nozzle i under manifold condition j
$P_{ij}$=liquid flow parameter measured for nozzle i under manifold condition j
$B_i$=linearized slope calibration coefficient
$A_i$=constant calibration coefficient Note: all of the double subscripted notation follows the convention that the first subscript denotes a specific nozzle and the second subscript identifies a specific manifold condition.

For the linearized case given by Equation (3), the total manifold liquid flow, $M_j$, is specified by summing the individual liquid flows from each of the N-liquid commissioned nozzles:

$$M_j = \sum_{i=1}^{N} [A_i + B_i * P_{ij}] \quad \text{Eq. (4)}$$

where:
$M_j$=total manifold liquid flow for manifold condition j

Equation (4) will be used to demonstrate the basis of the calibration procedure for the linearized liquid flow parameter of Equation (3). This calibration procedure enables the computation of the calibration coefficients $A_i$ and $B_i$ for each nozzle. The procedure requires running the manifold at a series of different conditions to generate a system of equations. In the preferred embodiment, those conditions are generated by temporarily and singly interrupting liquid flow to each of the liquid-commissioned nozzles. Each time a nozzle is temporarily decommissioned with liquid, the liquid flow parameter must be measured for each nozzle. In addition, the total liquid flow to the manifold must be measured. For example, when nozzle 1 is temporarily decommissioned, liquid flow parameter $P_{21}$ is the liquid flow parameter measured for nozzle 2; $P_{11}$ is the liquid flow parameter for nozzle 1 with zero liquid flow to nozzle 1. The entire system of equations is expressed in matrix form as shown in Table 1.

TABLE 1
SYSTEM OF EQUATIONS
FOR ALL MANIFOLDED NOZZLES

| $M_1$ |   | 0 $P_{21}$ ... $P_{N1}$ | 0 1 ... 1 |   | $B_1$ |
|---|---|---|---|---|---|
| $M_2$ |   | $P_{12}$ 0 ... $P_{N2}$ | 1 0 1 .. 1 |   | $B_2$ |
| . |   |   |   |   | . |
| $M_N$ |   | $P_{1N} P_{2N}$ ... 0 | 1 1 ... 0 |   | $B_N$ |
| 0 | = | $P_{11}$ ... 0 0 | 1 0 ... 0 | * | $A_1$ |
| . |   | 0 $P_{22}$ 0 0 | 0 1 0 .. 0 |   | . |
| . |   | 0 0 . 0 0 | . . |   | . |
| 0 |   | 0 0 . . . 0 $P_{NN}$ | 0 0 .. 1 |   | $A_N$ |

Equations generated by rows j and j+N respectively specify: 1) the total manifold, liquid flow; and 2) the zero liquid flow condition for the jth nozzle. The left most vector is called the flow vector, the matrix is the calibration data matrix, and the right most vector contains the unknown slopes and intercepts (e.g., the calibration coefficients).

Turning oil off to one nozzle will cause an oil flow change at the other N−1 nozzles. For example, if the total manifold flow is held constant, decommissioned one or more nozzles will generally increase the flow to each remaining nozzle. Rows 1 to N specify the total manifold liquid flow rate with each nozzle sequentially and temporarily decommissioned with liquid flow.

For no oil flow to the $i^{th}$ nozzle, Equation (4) is equivalently written as:

$$M_j = \sum_{i=1}^{N} (A_i + B_i * P_{ij}) \quad i \neq j \quad (5)$$

(note for $i = j$, argument = 0)

Rows N+1 to 2N specify the zero liquid flow condition through the ith nozzle while it is temporarily decommissioned with liquid.

Equation for the nozzle with no oil flow (i=j):

$$F_{ij}=0=B_i{}^*P_{ij}+A_i=B_iP_{ii}+A_i \tag{6}$$

The above variables are summarized as follows:
- $M_j$ = total oil manifold flow for manifold condition j (as shown above that condition is for no oil flow to the jth nozzle)
- $F_{ij}$ = liquid flow to $i^{th}$ nozzle (=0 if nozzle is decommissioned with liquid)
- $P_{ij}$ = liquid flow parameter for $i^{th}$ nozzle where the first subscript i=the nozzle number and j=the manifold condition. For the matrix shown in Table 1, the second subscript j refers to the nozzle number temporarily decommissioned with liquid flow.
- $A_i$ = constant calibration coefficient to be determined for nozzle i
- $B_i$ = slope calibration coefficient to be determined for nozzle i For a feed system with N liquid-commissioned nozzles and a corresponding N ROs, a system of 2N equations can be written relating the liquid flow parameters to liquid flow rate. (Note: N may be less than or equal to the total number of physical nozzles installed on the manifold. Normally or permanently decommissioned nozzles may be ignored while performing the matrix calibration experiments.) In this demonstration case, the liquid flow parameter is approximately linear and the corresponding equations are linear; each equation being uniquely specified by a slope and intercept. For N liquid commissioned nozzles, this representation results in N unique slopes and N unique intercepts. The procedure described in this invention teaches a method for determining the necessary liquid flow calibration coefficients (slopes and intercepts for the linear case).

A particularly effective scheme of formulating these equations for the linear case is as follows:

1) Measure the liquid flow parameters for each liquid-commissioned nozzle and the total liquid flow to the manifolded feed system for liquid flowing to all liquid-commissioned nozzles while the liquid flow to one commissioned nozzle temporarily interrupted. The liquid flow parameter must also be measured for the nozzle which has been temporarily decommissioned. This measurement is best made at a time when all liquid and gas flows to the feed system have reached steady state flow conditions.

2) Recommission (put the nozzle back in service) nozzle whose flow was temporarily interrupted and then temporarily decommission a different nozzle.

3) Repeat the measurements of steps 1 and 2 above when conditions have reached steady state.

4) Continue the above procedure until N sets of measurements have been made while each liquid-commissioned nozzle has been singly and temporarily decommissioned.

5) For non-linear representations, additional independent measurements must be made. For each additional non-zero term in the equation, an additional N independent measurements are required.

The above procedure, denoted as the calibration measurement scheme, provides the necessary numerical data for the Table 1 equations. This measurement scheme provides the data for the flow vector. The first N values of the flow vector are the total manifold liquid flows; the second set of flows in the flow vector are the liquid flows to the nozzle that was temporarily decommissioned (e.g., zero flow). The data for the first N rows of the calibration matrix are the liquid flow parameters from the liquid commissioned nozzles with non-zero liquid flows; data for the second N rows of the liquid calibration matrix are the liquid flow parameters from each temporarily decommissioned nozzle. The N unknown slopes and N unknown intercepts can be readily calculated using well known computational procedures (for example, matrix inversion). The solution for the N unknown slopes and N unknown intercepts is referred to as the liquid flow calibration coefficients. The solution for these coefficients constitutes a unique calibration for each sensor.

After the calibration coefficients have been determined, it is possible to check the overall absolute computation accuracy. With all of the liquid-commissioned nozzles recommissioned with liquid flow, the liquid flow parameter can be measured for each nozzle. The liquid mass (or volume) flow rate can then be computed for each nozzle. The sum of the liquid flows through each nozzle should be comparable to the liquid flow rate being supplied to the manifold.

The above calibration measurement scheme is clearly not unique. However, available data indicate the outlined scheme minimizes experimental data collection requirements and provides computational advantages with respect to roundoff error and speed. The use of redundant data for crosschecking the calibration flow coefficients or minimizing effects of measurement uncertainty is useful. The redundant data may include a multitude of manifold flow conditions or repeats of the same flow conditions.

In some cases, the liquid flow parameter may not be sufficiently linear to represent flows by a linearized slope and intercept. In such cases, there may be higher order terms such as polynomial expressions. To solve for the additional liquid flow calibration coefficients, supplementary flow conditions will need to be tested during the calibration measurement scheme.

For the situation where non-linear terms are included in the correlation between the liquid flow parameter and the liquid mass flow rate, the aforementioned scheme for formulating the equations must be supplemented. Each additional non-linear term will have a corresponding unknown calibration coefficient that must be determined. For a manifold with N liquid commissioned nozzles, each non-linear term will provide an additional N such coefficients (one supplemental coefficient for each nozzle). It is therefore necessary to generate an additional N equations to specify the additional N unknown coefficients. These additional N equations can be specified by sequentially restricting the liquid flow to each nozzle in addition to fully decommissioning the liquid flow.

This scheme of partially restricting liquid flow also provides a method of obtaining the necessary number of equations when block valves (17 in FIG. 1d) are not fully operative. For example, if a block valve cannot be fully closed or is totally inoperative, additional equations can be obtained by closing the defective valve as much as possible or partially restricting the liquid flow to another nozzle.

It is a practice in some liquid feed systems to add back pressure to the oil supply manifold by slightly throttling the liquid flow control valve at each nozzle. This practice causes no particular difficulties for the calibration measurement scheme. The calibration measurement scheme described above does not mandate that any specific nonzero flow rates be achieved. The only requirement for the preferred embodiment is that liquid flow to each nozzle can be temporarily and fully decommissioned. In fact, after the flow parameters have been determined, said liquid flow control valves may be used to redistribute the flow in accord with the desired distribution pattern.

In manifold systems where nozzles are inoperative or normally decommissioned, the effective number of equations can be accordingly reduced. The above calibration measurement scheme can be implemented for less than the physical number of nozzles by simply omitting the normally or permanently decommissioned nozzle(s).

The liquid flow parameters, $P_{ij}$, detailed in Table 1, can be measured nonintrusively using accelerometers, static or dynamic pressure gauges as was described previously and shown in FIG. 1.

It is well known that changes in the dimension of the nozzle throat area will affect the pressure drop across the nozzle during conditions of liquid and gas flow. The effect of erosion is to decrease pressure drop across the nozzle throat enabling an increase in liquid flow rate for fixed amount of atomization gas and upstream liquid header pressure. The decreased nozzle pressure drop results in an increased RO pressure drop, thereby increasing the RO gas peak; an increase to the liquid flow peak; but a decrease in static pressure upstream of the nozzle throat. Partial plugging at the nozzle tip has the opposite effect on nozzle pressure drop, static pressure, liquid flow rate, liquid flow peak, and RO gas peak. For conditions of no liquid flow, modest amounts of nozzle erosion or plugging cause essentially no change in steam flow. Therefore, modest nozzle erosion/plugging will cause no change in the RO gas peak signal or static pressure for conditions of no liquid flow.

Erosion of the gas RO has the opposite effect of nozzle erosion: RO erosion will result in decreased liquid mass (or volume) flow because of the increased gas flow thereby producing a decrease to the liquid flow peak. Similarly, partial plugging at the RO decreases total steam mass flowing enabling increased liquid flow. However, unlike nozzle erosion, RO erosion or plugging will cause a change in the acceleration signal for the condition of no liquid flow. To first order, it is known that the RO acceleration is directly proportional to the mass of the gas flow for fixed RO pressure drop. Partial plugging of the gas at the RO has the opposite effect of RO erosion.

Figure 3:
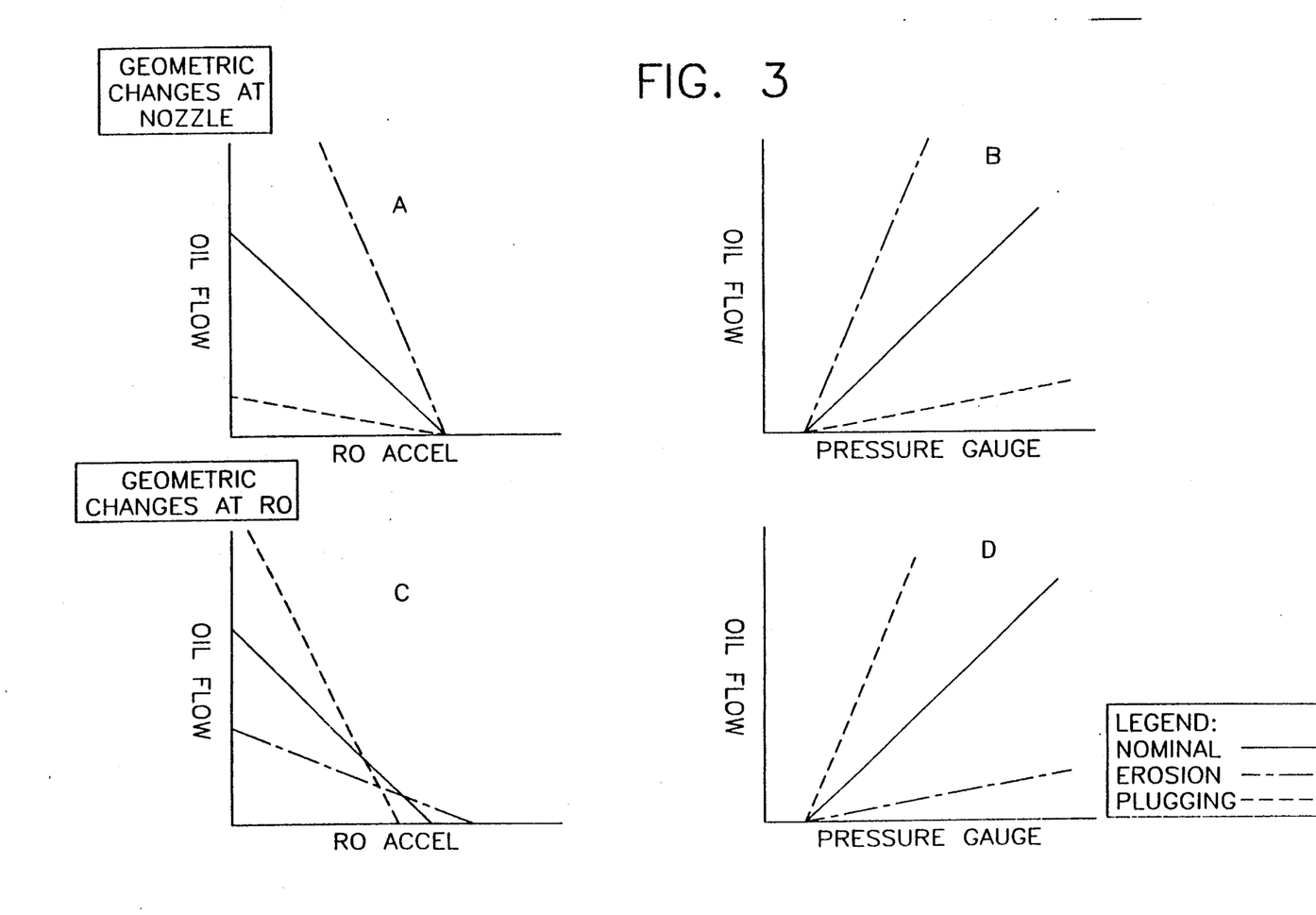
FIG. 3 shows examples of hypothetical liquid flow calibration curves to demonstrate plugging or erosion. The solid curves are the flow representations with base case nozzle and RO geometrics. Dashed curves depict erosion and circled curves depict plugging.

The qualitative effects of geometric changes at the nozzle and RO are illustrated in FIG. 3. The static pressure results are representative for pressure gauge location (29) in FIG. 1d. The RO acceleration results are representative of the gas peak signal measured by accelerometer (24) in FIG. 1d.

For the case of no liquid flow (oil block valve closed), the behavior of the gas peak parameter enables the distinction between geometric changes at the RO or nozzle throat. For small changes (within 20% of area) in RO geometry, there is essentially no change in the static pressure downstream of the RO. Downstream RO pressure is maintained at the discharge pressure downstream of the nozzle throat. However, the dynamic pressure or RO acceleration does change because the actual steam mass flow rate has changed. In contrast, the steam mass flow rate (for no liquid flow) is not affected by small geometric changes at the nozzle throat orifice. Therefore, the use of RO acceleration or dynamic pressure enables a clear mechanism to distinguish between RO and nozzle geometry changes. This result is also illustrated in FIG. 3.

Figure 4:
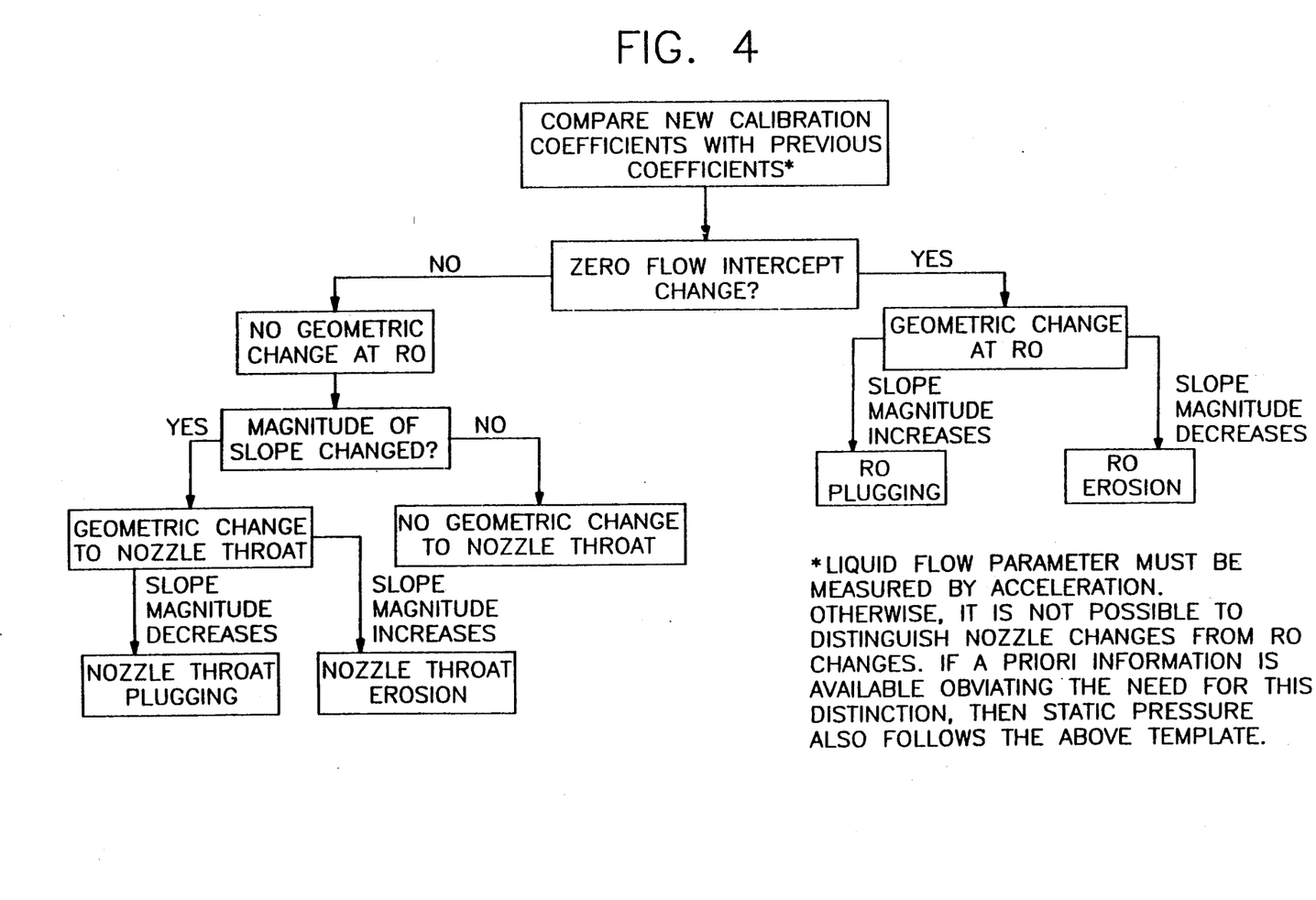
FIG. 4 shows a template detailing the analysis procedure for identifying location (nozzle or RO) and type of change (erosion or plugging).

The novel aspect of this invention utilizes the flow measuring scheme depicted in Table 1 to quantify the observed erosion and plugging. Geometric changes at the nozzle throat or RO will become manifest by changes in the calibration coefficients $A_i$, $B_i$. A template for identifying feed system geometric changes can be generated from FIG. 3 as shown in FIG. 4. To use FIG. 4, it is assumed that both a base case determination of the Table 1 slopes and intercepts and a subsequent test case are available. Alternatively, slopes and intercepts can be compared with other nozzles (with identical design geometries) on the same manifold. Whether the liquid flow parameter is measured with static pressure (at 30 in FIG. 1d) or RO acceleration (at 24 in FIG. 1d), FIG. 4 is used as follows to identify geometric changes:

1. No change in slopes/intercepts: implies that no geometric changes have occurred downstream of the liquid/gas mix point or at the RO. Changes in liquid mass (or volume) flow rate can then be attributed to liquid flow rate changes upstream from the liquid/gas mix point in the liquid line.

2. Using the RO acceleration gas peaks as the liquid flow parameter: if the intercept to the acceleration axis (zero liquid flow) has changed implies that the RO geometry has changed. If the axis intercept has not changed, then the RO geometry has not changed.

3. After determining whether geometric changes have occurred at either the RO or nozzle throat, either dynamic pressure, static pressure, RO acceleration (vapor peaks), or liquid flow peaks can determine the direction of change as indicated below.

4. Geometric changes at the nozzle throat are indicated by:
   a) slope magnitude (absolute) increases: implies nozzle erosion
   b) slope magnitude (absolute) decreases: implies nozzle plugging 5. Geometric changes at the RO are indicated by:
   a) slope magnitude (absolute) decreases: implies RO erosion
   b) slope magnitude (absolute) increases: implies RO plugging 6. Concurrent changes to both the RO and nozzle geometries cannot be uniquely addressed by this invention. However, if this condition is expected, plumbing designs usually permit on-line RO replacement inspection and/or replacement. Fluidized catalytic cracking operations have generally indicated greater probability of geometric changes occurring first at the nozzle throat rather than the RO.

The above procedure enables nozzle or RO geometries to be archived and tracked on a quantitative basis. The changes in slopes and intercepts enable computation of per nozzle flow rates directly attributable to geometric changes in the feed systems. In cases where the total liquid flow rate has changed, then either the percent of liquid flow carried by each nozzle or the actual slope can be used as a quantitative indicator.

If desired, these flow rate changes can be translated to dimensional changes using standard two phase flow models for nozzles and ROs. To first order, it is known that the RO acceleration is directly proportional to the mass of the gas flow for fixed RO pressure drop. The mass flow of the gas under these conditions is proportional to the RO area. For example, a 5% increase in the RO characteristic diameter corresponds to a 10% area increase which will increase steam mass flow and acceleration by approximately 10%. Therefore, in a case where RO erosion has been identified, the RO erosion can be quantified by comparing the RMS acceleration signal measured on or near the RO with its nominal (base case) value for the case of zero liquid flow rate. The increase in rms acceleration signal is proportional to the area increase of the RO.

In a similar manner, nozzle throat erosion can be quantified by computing the ratio of the current slope calibration coefficient to the nominal base case slope calibration coefficient. For the case where static pressure is used as the liquid flow parameter, the ratio of slopes is equal to the ratio of increased nozzle upstream pressure required to maintain a given liquid flow rate prior to the onset of erosion.

To a first approximation, a 5% increase in the characteristic diameter of the nozzle throat will increase the throat cross-sectional area by approximately 10%, thereby decreasing the flow resistance approximately 10%, which will change the slope in FIG. 3b by 10%.

These pressure drop and flow arguments can easily be extended to other linear flow parameters relative to geometry changes in the RO or nozzle throat. Changes in feed atomization can be inferred from these flow parameters. Consequently, the procedure enables operating decisions such as decommissioning eroded nozzles, repairing plugged ROs, etc.

In cases where the liquid flow parameter includes nonlinear terms, the above interpretation must be modified. The necessary modification can be determined by simple simulation tests. However, the change in calibration coefficients over time can be monitored as in the linear case.

Figure 5A:
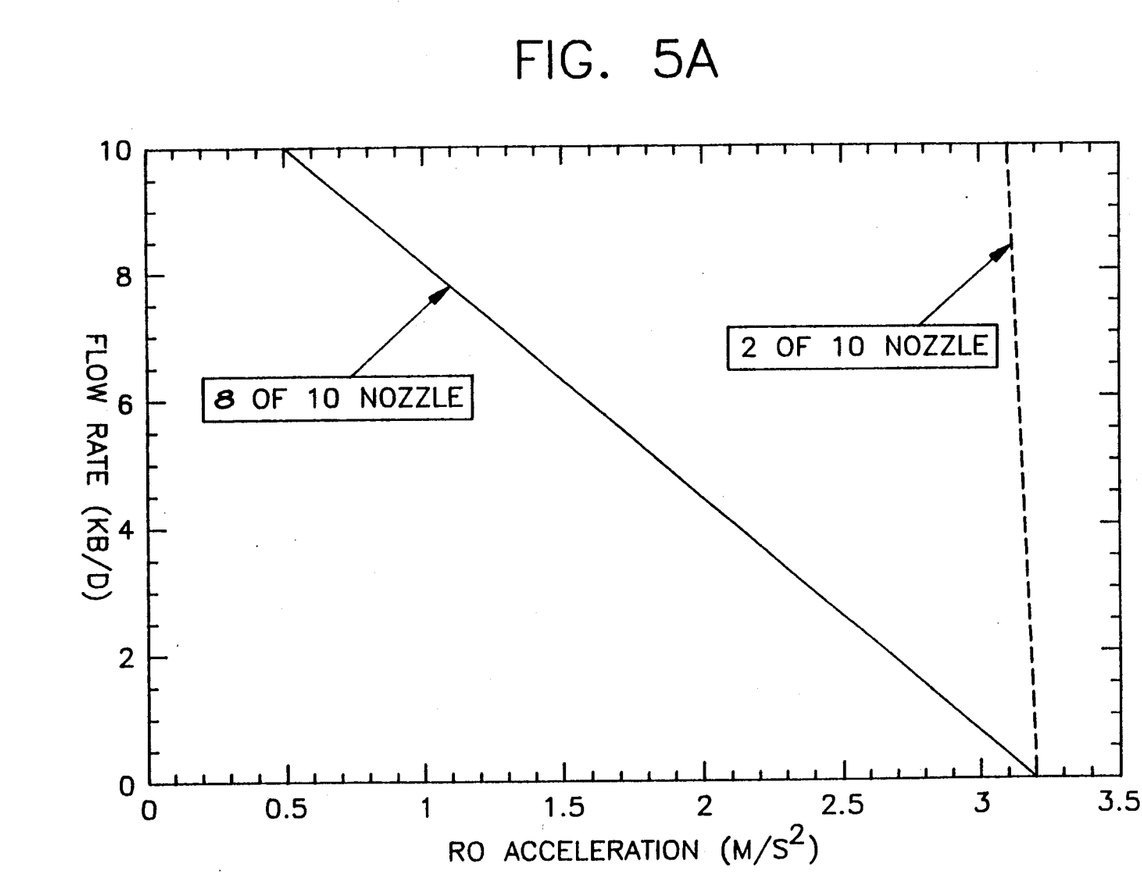
FIG. 5a is a specific example showing nozzle erosion using RO acceleration gas peak.
Figure 5B:
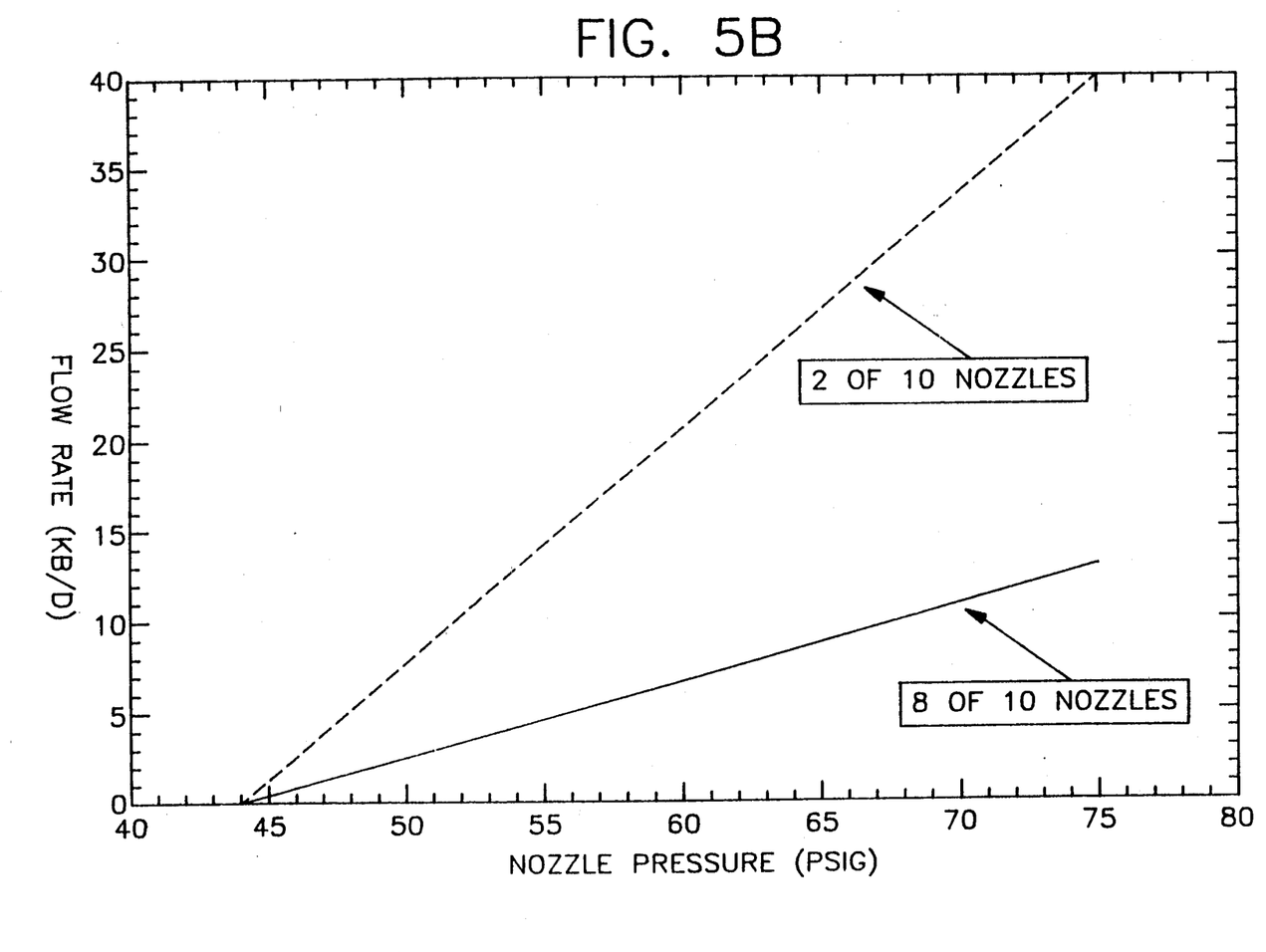
FIG. 5b is a specific example showing nozzle erosion using static pressure.

FIG. 5a shows a field example where the linear relationship between liquid flow rate and rms acceleration gas peak is specified for two nozzle groups. The liquid flow rate is specified in Kbl/d (=1000 Barrel/day where 1 barrel equals 42 US gallons). The acceleration is in m/sec$^2$ measured by an accelerometer (24) in FIG. 1d. The rms acceleration was computed over the 1000–5000 Hz range. For the ten nozzle system, two of the ten nozzles showed correlations similar to the solid curve in FIG. 5a. The increased slope magnitude on that curve compared to most of the other nozzles suggests geometric similarities within each group and differences between groups. FIG. 5b shows the results of the same nozzle manifold system using static pressure as the liquid flow parameter ((29) in FIG. 1d). The same conclusion regarding geometric similarities is drawn using either static pressure or RO acceleration as the liquid flow parameter.

What is claimed is:

1. An in-service method for determining erosion/plugging from each liquid commissioned nozzle in a plurality of nozzles in a manifolded system which carry two-phase liquid/gas flow comprising:
   (a) interrupting the liquid flow through one of said liquid commissioned nozzles;
   (b) measuring the total volume of the liquid flow to the manifolded system;
   (c) measuring a liquid flow parameter for each of said liquid commissioned nozzles (including the one with temporarily interrupted liquid flow) where the parameter is functionally related to the volume of liquid flow;
   (d) repeating steps (b) and (c) for each of said liquid commissioned nozzles in said manifold;
   (e) determining a functional relationship, including calibration coefficients, between the nozzle liquid flow and the liquid flow parameter for each liquid commissioned nozzle;
   (f) repeating steps (a) through (e) at a later time when it is desired to determine system plugging/erosion changes;
   (g) comparing the change over the passage of time in the calibration coefficients of the functional relationship and correlating the change with two phase flow models for plugging/erosion.

2. The method of claim 1 where said liquid flow parameter is provided by an accelerometer.

3. The method of claim 1 where said liquid flow parameter is provided by a dynamic pressure transducer.

4. The method of claim 1 where said liquid flow parameter is provided by a static pressure gauge.

5. The method of claim 1 where said liquid flow parameter is measured by acoustics or temperature.

6. The method of claim 1 wherein said functional relationship relating liquid flow and the liquid flow parameter is non-linear.

7. The method of claim 1 where calibration coefficients are compared to historic data on the same nozzle.

8. The method of claim 1 where calibration coefficients are compared to geometrically identical nozzles on the same manifold.

9. The method of claim 1 where the change in calibration coefficients are correlated quantitatively to nozzle throat flow models for two phase flows or RO geometric changes.

10. An in-service method for determining erosion/plugging from each liquid commissioned nozzle in a plurality of manifolded nozzles which carry two-phase liquid/gas flow wherein the volume of liquid flow is functionally related to a liquid flow parameter comprising:
   (a) restricting or interrupting the flow of liquid to at least one commissioned nozzle;
   (b) measuring the liquid flow parameter for each of said liquid commissioned nozzles after the restriction or interruption of step (a) (including the ones temporarily restricted or interrupted);
   (c) measuring the total volume of liquid flow to the manifold after the restriction or interruption in step (a);
   (d) repeating steps (a), (b) and (c) at least once for each unknown calibration coefficient in said functional relationship wherein the restriction or interruption of said flow through said nozzles results in different liquid flow parameters for at least one nozzle;
   (e) determining the functional relationship, including calibration coefficients between the liquid flow and the liquid flow parameter;
   (f) repeating steps (a) through (e) at a later time when it is desired to determine system plugging/erosion changes;
   (g) comparing the change over the passage of time in the calibration coefficients of the functional relationship and correlating that change with the two-phase flow models for plugging or erosion.

11. The method of claim 10 where said liquid flow parameter is provided by an accelerometer.

12. The method of claim 10 where said liquid flow parameter is provided by a dynamic pressure transducer.

13. The method of claim 10 where said liquid flow parameter is provided by a static pressure gauge.

14. The method of claim 10 where said liquid flow parameter is measured by acoustics or temperature.

15. The method of claim 10 wherein said functional relationship relating liquid flow and the liquid flow parameter is non-linear.

16. The method of claim 10 where calibration coefficients are compared to historic data on the same nozzle.

17. The method of claim 10 where calibration coefficients are compared to geometrically identical nozzles on the same manifold.

18. The method of claim 10 where the change in calibration coefficients are correlated quantitatively to nozzle throat flow models for two phase flows or RO geometric changes.

* * * * *